Patented Aug. 10, 1937

2,089,530

UNITED STATES PATENT OFFICE 2,089,530

PROCESSES FOR THE PREPARATION OF CONDENSATION PRODUCTS

Maurice Belloc, Paris, France, assignor to Société Nobel Francaise (Société Anonyme), Paris, France, a corporation of France No Drawing. Application October 13, 1934, Serial No. 748,263. In France October 20, 1933

4 Claims. (Cl. 260—2)

This process of production consists in substance in saponifying a polyvinyl ester and in condensing it in the presence of a concentrated solution of hydrochloric acid which serves as solvent and reagent medium. The operation is carried out in the cold from start to finish, that is to say without the application of external heat, all the primary materials being brought together at the commencement of the operation which takes place in a single phase. The polyvinyl alcohol formed is not isolated at any stage and it is not necessary to carry out the operation in the presence of an organic solvent although in certain cases it may be advantageous to employ a small quantity of organic solvent for accelerating the speed of the reactions.

The object of the present invention consists in having found that it is possible to produce condensation products of polyvinyl alcohol and aldehydes which possess novel and advantageous properties by using for the condensation no longer a single aldehyde as in my co-pending application Serial No. 661,636, now Patent 1,990,399, but a mixture of two aldehydes in any suitable proportion, and particularly mixtures of formaldehyde and acetic paraldehyde.

The advantages resulting from the use of two aldehydes for obtaining condensation products, prepared as indicated above, are as follows:—

1. The condensation products of polyvinyl alcohol and formaldehyde are only slightly hygroscopic and their mechanical properties are excellent: in any case and particularly when they are prepared from very viscous polyvinyl acetate, and when the saponification by hydrochloric acid is complete, they do not dissolve in the usual organic solvents: they only dissolve in certain halogen solvents such as chloroform, methylene chloride monochlorhydrine of glycol. These solvents sometimes present serious inconveniences:

(a) In general they are too poisonous.
    (b) They are not very numerous.
    (c) They have a tendency of liberating halogen acids.

This latter inconvenience is very serious in certain cases. Two of these cases are particularly important; in the first case the manufacture of supports for photographic and cinematographic films; it is well-known that even very insignificant traces of acid have a serious effect on sensitive emulsions; in the second case the manufacture of fabrics impermeable to very diffusible gases; it is well known that traces of acid coming into contact with fabrics especially in the presence of active light, produce a rapid deterioration of the fabrics.

2. Condensation products of polyvinyl alcohol and paracetaldehyde readily dissolve in the usual organic solvents: ethanol, methanol, methyl acetate, etc. They are, however, more hydroscopic than the preceding ones, and their mechanical properties are inferior.

According to the present invention, by mixing formaldehyde and paracetaldehyde in suitable proportions, there are obtained products which are soluble in ordinary solvents, or mixtures thereof in suitable proportions whilst preserving the weak hygroscopicity and the good mechanical properties of condensation products with a base of formaldehyde.

It may also be mentioned that the mixed condensation products containing paracetaldehyde are less expensive than those only containing formaldehyde.

The proportions of the two aldehydes used may vary according to the properties which it is desired that the product obtained should possess.

It is not necessary in any case to cause the aldehydes to react successively the primary materials being always mixed together at the commencement of the reaction.

The solvents for the mixed condensation products according to the invention are not necessarily single solvents, but may be mixtures of liquids which separately do not dissolve the condensation products in question. This particularly applies to mixtures of methanol and benzene, ethanol and benzene, methyl acetate, benzene and ethanol.

These mixtures are of considerable interest in the case where a solvent of low boiling point or a mixture incapable of acidifying by hydrolysis, is desired.

*Example I.*—As primary material there is used polymerized vinyl acetate such that at the temperature of 20° C. the time of flow of a solution at 10% into ethyl acetate is 300 seconds through a given orifice, the time of flow of the same volume of water at the same temperature being 15 seconds.

There are mixed together in a suitable apparatus:—

| | Kgs. |
|---|---|
| Polymerized vinyl acetate as above described | 20 |
| Formaldehyde at 40% in volume | 7.200 |
| Acetic paraldehyde | 3.800 |
| Denatured alcohol | 4 |
| Hydrochloric acid at 22° Bé | 40 |

The mixture is agitated until complete dissolution and left in contact for 20 hours at ordinary temperature. At the end of this period the thick liquid obtained is precipitated with water. It is washed until neutral and then dried.

The product obtained readily dissolves in ethyl and methyl acetates. It also dissolves perfectly in a mixture of equal volumes of ethanol and benzene. When plastifying agents such as benzyl alcohol and paratoluol sulphamide are added thereto, materials can be obtained in the form of very flexible sheets which lend themselves readily to treatment by blowing.

*Example II.*—There is used as primary material the same vinyl acetate as in Example I. There are mixed together:—

| | Kgs. |
|---|---|
| Polymerized vinyl acetate as described in Example I | 20 |
| Formaldehyde at 40% in volume | 9.600 |
| Acetic paraldehyde | 2.550 |
| Denatured alcohol | 4 |
| Hydrochloric acid at 22° Bé | 40 |

The mixture is treated as in Example I.

The product obtained dissolves readily in mixtures of methyl acetate and benzene, methyl acetate, benzene and ethanol.

The following mixture:

| | Parts by weight |
|---|---|
| Methanol | 3 |
| Benzene | 5 | which evaporates easily and rapidly enables photographic and cinematographic films of normal thickness to be obtained without difficulty in a normal manner.

*Example III.*—There is used as primary material a polymerized vinyl acetate such that at a temperature of 20° C. the time of flow of a solution at 10% into ethyl acetate is 170 seconds through a given orifice, the time of flow of the same volume of water at the same temperature being 15 seconds.

There are mixed together as in Example I:—

| | Kgs. |
|---|---|
| Polymerized vinyl acetate as above described | 20 |
| Formaldehyde at 40% in volume | 4 |
| Acetic paraldehyde | 3.600 |
| Denatured alcohol | 4 |
| Hydrochloric acid at 22° Bé | 40 |

The mixture is left in contact for 24 hours in the cold and the process completed as in Example I.

The product obtained is soluble in methyl and ethyl acetates, methyl glycol, benzyl alcohol, mixtures of methyl acetate and ethanol in equal volumes.

*Example IV.*—There is used polymerized vinyl acetate as described in Example III.

There are mixed together:—

| | Kgs. |
|---|---|
| Vinyl acetate as described in Example III | 20 |
| Water | 16 |
| Formaldehyde at 40% in volume | 4 |
| Acetic paraldehyde | 3.600 |
| Hydrochloric acid at 22° Bé | 40 |

The mixture is treated as in Example I. The product is soluble in methyl and ethyl acetates.

*Example V.*—There is used polymerized vinyl acetate as described in Example III.

There are mixed together:—

| | Kgs. |
|---|---|
| Vinyl acetate as described in Example III | 20 |
| Water | 15 |
| Formaldehyde at 40% in volume | 5.520 |
| Acetic paraldehyde | 2.920 |
| Denatured alcohol | 4 |
| Hydrochloric acid at 22° Bé | 40 |

The mixture is treated as in Example I. The product obtained is soluble in methyl acetate; it leaves a slight residue insoluble in ethyl acetate. It dissolves readily in mixtures of ethanol and benzene methanol and benzene referred to in Examples I and II.

This product dissolved in one of the solvents referred to may be cast in the known manner so as to form a film 0.03 mm. in thickness.

This film introduced between two suitable fabrics such as flax, cotton, silk and so forth, united to the two sheets in any known manner, produces a fabric impermeable to very diffusible gases such as hydrogen or helium. This fabric may be rendered as flexible as desired by the addition of plastifying agents. This composite fabric allows less than 2.5 grammes of hydrogen to pass per square metre in 24 hours at a pressure of 30 mm. of water when the film contains 20 to 22% by weight of a stable plastifying agent. This composite fabric is also light and heat proof.

It is more particularly suitable for the manufacture of balloon envelopes.

The impermeability in question may be obtained by any other known means such as the direct coating of fabrics by means of a collodion in suitably plastified.

By this method it is also possible to obtain excellent balloon envelopes either with a single fabric, or with a multiple fabric of which the warps are crossed at 45° or not.

*Example VI.*—There is used polymerized vinyl acetate as described in Example I.

There are mixed together:—

| | Kgs. |
|---|---|
| Vinyl acetate as described in Example I | 20 |
| Formaldehyde at 40% in volume | 7.400 |
| Water | 14 |
| Acetic paraldehyde | 2 |
| Denatured alcohol | 4 |
| Hydrochloric acid of 22° Bé | 40 |

This mixture is treated as in Example I. The product obtained is insoluble in methyl and ethyl acetates.

It dissolves perfectly in a mixture of equal weights of methyl acetate and ethanol. This solution, suitably plastified, enables a support for a photographic or cinematographic film of a thickness of 0.12 mm. having excellent optical and mechanical properties to be obtained without difficulty.

It may be mentioned that in the formulae of preparation described a small quantity of ethanol is generally introduced into the reaction mass. This ethanol is in no way indispensable, it simply renders the reaction a little more rapid.

The condensation products obtained by the process described in the present application are particularly suitable for the manufacture of photographic and cinematographic films, coating impermeable to very diffusible gases for balloons plastic messes in blocks, sheets, tubes, and artificial fibres.

I claim:—

1. A process for the production of condensation products in a single phase reaction, comprising introducing at the start into a reaction vessel 20 kgs. of polymerized vinyl acetate, 40 kgs. hydrochloric acid at 22° Bé., from 4 to 9.6 kgs. 40% formaldehyde solution, from 2 to 3.8 kgs. of acetic paraldehyde, agitating the mixture, leaving the mixture in contact for from 20 to 24 hours without supplying any external heat, precipitating the product with water, and washing the product until neutral.

2. A process for the production of condensation products in a single phase reaction, comprising introducing at the start into a reaction vessel 20 kgs. of polymerized vinyl acetate, 40 kgs. hydrochloric acid at 22° Bé., 4 kgs. formaldehyde solution at 40% in volume, 3.6 kgs. acetic paraldehyde, 4 kgs. denatured alcohol, agitating the mixture, leaving the mixture in contact for 24 hours without supplying any external heat, precipitating the product with water, and washing the product until neutral.

3. A process for the production of condensation products in a single phase reaction, comprising introducing at the start into a reaction vessel 20 kgs. of polymerized vinyl acetate, 40 kgs. hydrochloric acid at 22° Bé., 16 kgs. water, 4 kgs. of formaldehyde at 40% in volume, 3.6 kgs. acetic paraldehyde, agitating the mixture, leaving the mixture in contact for 20 hours without supplying any external heat, precipitating the product with water, and washing the product until neutral.

4. A process for the production of condensation products in a single phase reaction, comprising introducing at the start into a reaction vessel 20 kgs. polymerized vinyl acetate, 40 kgs. hydrochloric acid at 22° Bé., 15 kgs. water, 5.520 kgs. formaldehyde at 40% in volume, 2.920 kgs. acetic paraldehyde, 4 kgs. denatured alcohol, agitating the mixture, leaving the mixture in contact for 20 hours without supplying any external heat, precipitating the product with water, and washing the product until neutral.

MAURICE BELLOC.